(12) United States Patent
Lee et al.

(10) Patent No.: US 10,577,517 B2
(45) Date of Patent: Mar. 3, 2020

(54) HIGH-SOLID COATING COMPOSITION AND COATING METHOD USING THE SAME

(71) Applicants: Hyundai Motor Company, Seoul (KR); Kia Motors Corporation, Seoul (KR); Hyundai Mobis Co., Ltd., Seoul (KR)

(72) Inventors: Hee Joon Lee, Seoul (KR); Ki Wan Park, Ulsan (KR); Young Ho Choi, Seongnam-Si (KR); Jong Yang Park, Cheonan-Si (KR); Ju Hyun Kim, Yongin-Si (KR); Chang Myung Song, Busan (KR); Jung Hwan Lee, Yongin-Si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 69 days.

(21) Appl. No.: 15/836,006

(22) Filed: Dec. 8, 2017

(65) Prior Publication Data

US 2018/0305575 A1    Oct. 25, 2018

(30) Foreign Application Priority Data

Apr. 24, 2017   (KR) .................. 10-2017-0052333

(51) Int. Cl.
*C09D 133/08*  (2006.01)
*C09D 133/14*  (2006.01)
*C09D 133/06*  (2006.01)

(52) U.S. Cl.
CPC ....... *C09D 133/14* (2013.01); *C09D 133/066* (2013.01); *C09D 133/08* (2013.01)

(58) Field of Classification Search
CPC .................................................. C09D 133/08
See application file for complete search history.

(56) References Cited

U.S. PATENT DOCUMENTS

| 2002/0115781 A1* | 8/2002 | Pourreau ............. C08J 3/091 524/700 |
| 2005/0053791 A1* | 3/2005 | Van Engelen ..... C08G 18/2825 428/423.1 |
| 2012/0130002 A1* | 5/2012 | Schall ............... C08G 18/1808 524/507 |

FOREIGN PATENT DOCUMENTS

| KR | 10 2011-00622 A  |   | 6/2011 |
| KR | 20110062222 A    | * | 6/2011 |

* cited by examiner

*Primary Examiner* — Michael F Pepitone
(74) *Attorney, Agent, or Firm* — Morgan, Lewis & Bockius LLP

(57) ABSTRACT

A high-solid coating composition may include about 70 wt % to about 80 wt % of an acrylic resin; and about 15 wt % to about 21 wt % of a solvent, wherein a content of non-volatile components (NVs) is about 55 wt % to about 60 wt %, a solid by volume ratio (SVR) is about 50% to about 55%, and a combination factor (CF) value being an appearance evaluation index is about 78% or more.

13 Claims, No Drawings

HIGH-SOLID COATING COMPOSITION AND COATING METHOD USING THE SAME

CROSS-REFERENCE TO RELATED APPLICATION

The present application claims priority to Korean Patent Application No. 10-2017-0052333 filed Apr. 24, 2017, the entire contents of which is incorporated herein for all purposes by this reference.

BACKGROUND OF THE INVENTION

Field of the Invention

The present invention relates to a high-solid coating composition and a coating method using the same, and more particularly, is characterized to decrease volatile organic chemicals (VOCs) by making a coating highly solidified to reduce the amount of volatile solvent used and to improve the appearance quality of a coating film by enhancing the coating workability.

Description of Related Art

Recently, due to the development of the organic chemical industry, the global environment has rapidly deteriorated, such as air pollution, global warming, and destruction of ozone layers. In order to prevent the environmental destruction as described above, the use of volatile organic compounds needs to be maximally suppressed. As an effort thereof, high solidification of coating has drawn attention.

However, a high-solid coating composition has a problem in that the composition is slowly dried during the coating, and the coating workability significantly deteriorates as compared to the existing medium solid coating. In order to make a coating highly solidified, a resin having a high content of non-volatile components is used, and when a low molecular weight resin is used, reactivity of the resin deteriorates, so that drying properties deteriorate as compared to medium solid coatings, and accordingly, the appearance quality deteriorates because there occurs a phenomenon in which the coating film flows.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a high-solid coating composition which can improve the appearance quality of a coating film due to the enhanced coating workability while being capable of reducing volatile organic compounds due to the small amount of volatile solvents used, and a coating method using the same.

The object of the present invention is not limited to the aforementioned object. The object of the present invention will be more apparent from the following description and will be realized by means described in the claims and by combinations thereof.

In one aspect, the present invention suggests a high-solid coating composition having the following configuration as a means for achieving the aforementioned object.

The high-solid coating composition comprises about 70 wt % to about 80 wt % of an acrylic resin and about 15 wt % to about 21 wt % of a solvent, and a content of non-volatile components (NVs) may be about 55 wt % to about 60 wt %, a solid by volume ratio (SVR) may be about 50% to about 55%, and a combination factor (CF) value being an appearance evaluation index may be about 78% or more.

In an exemplary embodiment of the present invention, the high-solid coating composition may have a viscosity of about 30 seconds to about 35 seconds, which is measured by a Ford Cup #4 viscometer.

In another exemplary embodiment, the high-solid coating composition may further comprise about 1 wt % to about 4 wt % of an additive, and the additive may be selected from the group consisting of a UV absorber, a slip agent, an anti-contamination agent, a light stabilizer, a surface conditioner, a drying promoter, and a combination thereof.

In yet another exemplary embodiment, the acrylic resin may comprise: a first acrylic polyol resin having a non-volatile component (NV) content of about 70 wt % to about 80 wt %, a hydroxy group content of about 3.0 wt % to about 3.5 wt %, and a glass transition temperature of about 20° C. to about 30° C.; and a second acrylic polyol resin having a non-volatile component (NV) content of about 70 wt % to about 80 wt %, a hydroxy group content of about 2.2 wt % to about 2.5 wt %, and a glass transition temperature of about 17° C. to about 20° C.

In yet another exemplary embodiment, the acrylic resin may comprise about 35 wt % to about 45 wt % of a first acrylic polyol resin and about 25 w % to about 35 wt % of a second acrylic polyol resin.

In still yet another exemplary embodiment, the acrylic resin may comprise about 45 wt % of a first acrylic polyol resin and about 30 wt % of a second acrylic polyol resin.

In a further exemplary embodiment, the acrylic resin may comprise: a first acrylic polyol resin having a non-volatile component (NV) content of about 70 wt % to about 80 wt %, a hydroxy group content of about 3.0 wt % to about 3.5 wt %, and a glass transition temperature of about 20° C. to about 30° C.; a second acrylic polyol resin having a non-volatile component (NV) content of about 70 wt % to about 80 wt %, a hydroxy group content of about 2.2 wt % to about 2.5 wt %, and a glass transition temperature of about 17° C. to about 20° C.; and a third acrylic polyol resin having a non-volatile component (NV) content of about 70 wt % to about 80 wt %, a hydroxy group content of about 1.8 wt % to about 2.1 wt %, and a glass transition temperature of about 10° C. to about 16° C.

In another further exemplary embodiment, the acrylic resin may comprise about 35 wt % to about 40 wt % of a first acrylic polyol resin, about 15 w % to about 30 wt % of a second acrylic polyol resin, and about 5 wt % to about 25 wt % of a third acrylic polyol resin.

In yet another further exemplary embodiment, the acrylic resin may comprise about 40 wt % of a first acrylic polyol resin, about 30 w % of a second acrylic polyol resin, and about 5 wt % of a third acrylic polyol resin.

In yet another further exemplary embodiment, the high-solid coating composition may further include a non-aqueous dispersion resin and a radiation curing resin.

In still yet another further exemplary embodiment, the solvent may include a slow-drying solvent, and the slow-drying solvent may be selected from the group consisting of butyl cellosolve acetate, dibasic ester, and a combination thereof.

In a still further exemplary embodiment, the solvent may comprise about 6 wt % to about 7 wt % of a quick-drying solvent, about 1 wt % to about 2 wt % of a medium-drying solvent, about 9 wt % to about 10 wt % of a slow-drying solvent, and about 1.5 wt % to about 2.5 wt % of a ketone-based solvent.

Various aspects of the present invention are directed to providing a coating method using the high-solid coating composition, the coating method including: forming a coating film by coating the high-solid coating composition to a thickness of about 30 μm to about 40 μm (e.g., about 30 μm, about 31 μm, about 32 μm, about 33 μm, about 34 μm, about 35 μm, about 36 μm, about 37 μm, about 38 μm, about 39 μm, or about 40 μm).

In an exemplary embodiment of the present invention, a coating film may be formed by coating the high-solid coating composition with an application area of about 15 $m^2/l$ to 20 $m^2/l$ (e.g., about 15 $m^2/l$, about 16 $m^2/l$, about 17 $m^2/l$, about 18 $m^2/l$, about 19 $m^2/l$, or about 20 $m^2/l$).

Since the present invention includes the foregoing configuration, the following effects may be obtained according to the configuration.

The high-solid coating composition according to an exemplary embodiment of the present invention is eco-friendly and has an effect in which the working environment is greatly improved during the coating because the composition includes volatile organic compounds in a small amount.

The high-solid coating composition according to an exemplary embodiment of the present invention has excellent drying property and coating workability according to the adjustment of the contents of an acrylic resin and an acrylic polyol resin having specific physical properties included in the acrylic resin, the use of slow-drying solvent, and the like, and thus has an effect in which the appearance quality of the coating film is significantly improved during the coating.

The effects of the present invention are not limited to the aforementioned effects. The effects of the present invention are to be understood to include all the effects capable of being inferred from the following explanation.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through Examples. The Examples of the present invention may be modified in various forms as long as the gist of the invention is not changed. However, the right scope of the present invention is not limited to the following Examples.

If it is judged that publicly known configurations and functions may obscure the gist of the present invention, the description on the publicly known configurations and functions will be omitted. The term "including" in the present specification means further including other constituent elements unless otherwise specifically described.

Various aspects of the present invention are directed to providing a high-solid coating composition comprising about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %) of an acrylic resin, about 15 wt % to about 21 wt % (e.g., about 15 wt %, about 16 wt %, about 17 wt %, about 18 wt %, about 19 wt %, about 20 wt %, or about 21 wt %) of a solvent, and about 1 wt % to about 4 wt % (e.g., about 1 wt %, about 2 wt %, about 3 wt %, or about 4 wt %) of an additive. In various exemplary embodiments, the high-solid coating composition has a non-volatile component (NV) content of about 55 wt % to about 60 wt % (e.g., about 55 wt %, about 56 wt %, about 57 wt %, about 58 wt %, about 59 wt %, or about 60 wt %), a solid by volume ratio (SVR) of about 50% to about 55% (e.g., about 50 wt %, about 51 wt %, about 52 wt %, about 53 wt %, about 54 wt %, or about 55 wt %), a combination factor (CF) value of about 78 or more (e.g., about 78, about 79, about 80, about 81, about 82, about 85, about 90, or more) which is an appearance evaluation index, and a viscosity of about 30 seconds to about 35 seconds measured by a Ford Cup #4 viscometer.

The high-solid coating composition according to an exemplary embodiment of the present invention is characterized to have a high content of non-volatile components (NVs) and a low viscosity. The content of volatile organic compounds may be lowered due to a high solid content, and the coating workability may be significantly improved due to low viscosity.

In the present specification, the term "volatile organic compounds" is also referred to as VOCs, collectively refers to liquid or gas phase organic compounds which are easily evaporated in the atmosphere due to the high vapor pressure, and means materials which cause photochemical smog by causing photochemical reactions in the atmosphere to produce photochemical oxidizers such as ozone.

The CF value being an appearance evaluation index of the high-solid coating composition according to an exemplary embodiment of the present invention may be about 78 or more (e.g., about 78, 79, 80, 81, 82, 83, 84, 85, or more) or 80 or more (e.g., about 80, 81, 82, 83, 84, 85, 86, 87, 88, 89, 90, 91, 92, 93, 94, 95, or more) when measured by using a wave scan apparatus. The higher the CF value is, the better the appearance is. Since the high-solid coating composition has a CF value of 78 or more, it is possible to significantly enhance the appearance quality while maintaining the content of volatile organic compounds at a low level.

Hereinafter, each constitution of the high-solid coating composition of the present invention will be described in detail.

Acrylic Resin

The acrylic resin is a constitution for improving coating workability, and chemical and physical properties and appearance quality of the coating film, and is preferably included in an amount of about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %) in the entire coating composition.

When the content of the acrylic resin is more than 80 wt %, the appearance quality and coating workability of the coating film may deteriorate, and when the content is less than 70 wt %, physical properties such as water resistance, heat resistance and wear resistance may deteriorate.

The acrylic resin according to various exemplary embodiments of the present invention includes a first acrylic polyol resin and a second acrylic polyol resin.

The first acrylic polyol resin and the second acrylic polyol resin may be prepared by polymerizing an ethylenically unsaturated monomer, an acid group-containing acrylic monomer, glycidyl ester, or a mixture thereof with an acrylic monomer containing a hydroxy group.

As the ethylenically unsaturated monomer, it is possible to use, for example, styrene, methyl(meth) acrylate, propyl (meth) acrylate, normal butyl(meth) acrylate, isobutyl(meth) acrylate, tertiary butyl(meth) acrylate, 2-ethylhexyl(meth) acrylate, benzyl(meth) acrylate, isobornyl(meth) acrylate, lauryl(meth) acrylate, and the like.

As the acid group-containing acrylic monomer, it is possible to use, for example, (meth)acrylic acid, fumaric acid, an acrylic acid dimer, maleic acid, and the like.

The glycidyl ester may be prepared by carrying out a glycidyl ester reaction of acrylic acid, methacrylic acid, or α-branched monocarboxylic acid with glycidol before, during, or after the polymerization reaction.

As the acrylic monomer containing a hydroxy group, it is possible to use, for example, hydroxyethyl(meth) acrylate, hydroxypropyl(meth) acrylate, hydroxybutyl(meth) acrylate, ε-caprolactone-added hydroxyethyl(meth) acrylate, and the like.

The acrylic resin may include about 35 wt % to about 45 wt % (e.g., about 35 wt %, about 36 wt %, about 37 wt %, about 38 wt %, about 39 wt %, about 40 wt %, about 41 wt %, about 42 wt %, about 43 wt %, about 44 wt %, or about 45 wt %), preferably 40 wt % of a first acrylic polyol resin and 25 wt % to 35 wt % (e.g., about 25 wt %, about 26 wt %, about 27 wt %, about 28 wt %, about 29 wt %, about 30 wt %, about 31 wt %, about 32 wt %, about 33 wt %, about 34 wt %, or about 35 wt %), preferably 30 wt % of a second acrylic polyol resin. The contents of the first acrylic polyol resin and the second acrylic polyol resin are expressed based on the total weight of the high-solid coating composition.

the first acrylic polyol resin has a non-volatile component (NV) content of about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %) and a hydroxy group content of about 3.0 wt % to about 3.5 wt % (e.g., about 3.0 wt %, about 3.1 wt %, about 3.2 wt %, about 3.3 wt %, about 3.4 wt %, or about 3.5 wt %), and the glass transition temperature of about 20° C. to about 30° C. (e.g., about 20° C., about 21° C., about 22° C., about 23° C., about 24° C., about 25° C., about 26° C., about 27° C., about 28° C., about 29° C., or about 30° C.), which may be implemented by appropriately adjusting the content of the above-described monomer.

In the present specification, the term "hydroxy group content" is a weight of a hydroxy group (—OH) based on the weight of a first acrylic polyol resin or a second acrylic polyol resin, and was expressed as a unit of "wt %".

When the content of the non-volatile components (NVs) of the first acrylic polyol resin falls within about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %), an effect of enhancing the appearance quality may be maximized, and when the hydroxy group content falls within about 3.0 wt % to about 3.5 wt % (e.g., about 3.0 wt %, about 3.1 wt %, about 3.2 wt %, about 3.3 wt %, about 3.4 wt %, or about 3.5 wt %), a sufficient curing effect may be obtained by a reaction with an isocyanate (—NCO) functional group according to the equivalent ratio, and when the glass transition temperature is about 20° C. to about 30° C. (e.g., about 20° C., about 21° C., about 22° C., about 23° C., about 24° C., about 25° C., about 26° C., about 27° C., about 28° C., about 29° C., or about 30° C.), the hardness of the coating film may be enhanced.

The second acrylic polyol resin has a non-volatile component (NV) content of 70 wt % to 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %) and a hydroxy group content of about 2.2 wt % to about 2.5 wt % (e.g., about 2.2 wt %, about 2.3 wt %, about 2.4 wt %, or about 2.5 wt %), and the glass transition temperature is about 17° C. to about 20° C. (e.g., about 17° C., about 18° C., about 19° C., or about 20° C.), which may also be implemented by appropriately adjusting the content of the above-described monomer.

When the content of the non-volatile components (NVs) of the second acrylic polyol resin falls within about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %), a transparent image clarity effect may be obtained, and when the hydroxy group content falls within about 2.2 wt % to about 2.5 wt % (e.g., about 2.2 wt %, about 2.3 wt %, about 2.4 wt %, or about 2.5 wt %), a sufficient curing effect may be obtained by a reaction with an isocyanate (—NCO) functional group according to the equivalent ratio, and when the glass transition temperature is about 17° C. to about 20° C. (e.g., about 17° C., about 18° C., about 19° C., or about 20° C.), the hardness of the coating film may be enhanced.

The acrylic resin according to various exemplary embodiments of the present invention includes a first acrylic polyol resin, a second acrylic polyol resin, and a third acrylic polyol resin.

The first acrylic polyol resin, the second acrylic polyol resin, and the third acrylic polyol resin may be prepared by polymerizing an ethylenically unsaturated monomer, an acid group-containing acrylic monomer, glycidyl ester, or a mixture thereof with an acrylic monomer containing a hydroxy group. The specific description on the monomer has been described above, and thus will be omitted below.

The acrylic resin may include about 35 wt % to about 40 wt % (e.g., about 35 wt %, about 36 wt %, about 37 wt %, about 38 wt %, about 39 wt %, about 40 wt %, about 41 wt %, about 42 wt %, about 43 wt %, about 44 wt %, or about 45 wt %), preferably 40 wt % of a first acrylic polyol resin; about 15 wt % to about 30 wt % (e.g., about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 2925 wt %, or about 30 wt %), preferably 30 wt % of a second acrylic polyol resin; and about 5 wt % to about 25 wt % (e.g., about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt %), preferably 5 wt % of a third acrylic polyol resin. The contents of the first acrylic polyol resin, the second acrylic polyol resin, and the third acrylic polyol resin are expressed based on the total weight of the high-solid coating composition.

The first acrylic polyol resin has a non-volatile component (NV) content of about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %), a hydroxy group content of about 3.0 wt % to about 3.5 wt % (e.g., about 3.0 wt %, about 3.1 wt %, about 3.2 wt %, about 3.3 wt %, about 3.4 wt %, or about 3.5 wt %), and a glass transition temperature of about 20° C. to about 30° C. (e.g., about 20° C., about 21° C., about 22° C., about 23° C., about 24° C., about 25° C., about 26° C., about 27° C., about 28° C., about 29° C., or about 30° C.).

When the content of the non-volatile components (NVs) of the first acrylic polyol resin falls within 70 wt % to 80 wt %, an effect of enhancing the gloss and appearance quality of the coating film may be maximized, and when the hydroxy group content falls within 3.0 wt % to 3.5 wt %, a sufficient curing effect may be obtained by a reaction with an isocyanate (—NCO) functional group according to the equivalent ratio, and when the glass transition temperature is 20° C. to 30° C., the hardness of the coating film may be enhanced.

The second acrylic polyol resin has a non-volatile component (NV) content of about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %), a hydroxy group content of about 2.2 wt % to about 2.5 wt % (e.g., about 2.2 wt %, about 2.3 wt %, about 2.4 wt %, or about 2.5 wt %), and a glass transition temperature of about 17° C. to about 20° C. (e.g., about 17° C., about 18° C., about 19° C., or about 20° C.).

When the content of the non-volatile components (NVs) of the second acrylic polyol resin falls within 70 wt % to 80 wt %, an effect of enhancing the appearance image clarity may be maximized, and when the hydroxy group content falls within 2.2 wt % to 2.5 wt %, a sufficient curing effect may be obtained by a reaction with an isocyanate (—NCO) functional group according to the equivalent ratio, and when the glass transition temperature is 17° C. to 20° C., an appropriate effect of hardening the coating film may be implemented.

The third acrylic polyol resin has a non-volatile component (NV) content of about 70 wt % to about 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %), a hydroxy group content of about 1.8 wt % to about 2.1 wt % (e.g., about 1.8 wt %, about 1.9 wt %, about 2.0 wt %, or about 2.1 wt %), and a glass transition temperature of about 10° C. to about 16° C. (e.g., about 10° C., about 11° C., about 12° C., about 13° C., about 14° C., about 15° C., or about 16° C.).

When the content of the non-volatile components (NVs) of the third acrylic polyol resin falls within 70 wt % to 80 wt %, the hardness and drying property of the coating film may be adjusted at an appropriate level, and when the hydroxy group content falls within 1.8 wt % to 2.1 wt %, a sufficient curing effect may be obtained by a reaction with an isocyanate (—NCO) functional group according to the equivalent ratio, and when the glass transition temperature is 10° C. to 16° C., an appropriate effect of hardening the coating film may be implemented.

The high-solid coating composition may further include a non-aqueous dispersion resin and a radiation curing resin in addition to the acrylic resin.

The non-aqueous dispersion resin is a constitution for improving the flowability and polishing property of the high-solid coating composition, and may be composed of a combination of an acrylic polymer, a dispersing medium (an aliphatic hydrocarbon), a particle polymer (diameter 0.1 μm to 0.8 μm), a dispersion stabilizer, and the like.

The radiation curing resin is a constitution for improving the flowability of the high-solid coating composition, and may be composed of a combination of wax, RC resin, microgel, aerogel (porous silica), Benton, and the like.

Solvent

The solvent is a constitution associated with coating workability and appearance quality, and is included in an amount of about 15 wt % to about 21 wt % (e.g., about 15 wt %, about 16 wt %, about 17 wt %, about 18 wt %, about 19 wt %, about 20 wt %, or about 21 wt %) in the entire coating composition, and it is preferred to use a solvent in which about 6 wt % to about 7 wt % of a quick-drying solvent, about 1 wt % to about 2 wt % of a medium-drying solvent, about 9 wt % to about 10 wt % of a slow-drying solvent, and about 1.5 wt % to about 2.5 wt % of a ketone-based solvent are mixed.

An effect of enhancing the workability may be obtained by using the quick-drying solvent, the medium-drying solvent, and the slow-drying solvent in combination, and the appearance quality may be further improved by using the slow-drying solvent in an excessive amount among them.

In the present specification, the term "quick-drying solvent" means a solvent whose evaporation rate is two times to three times or more faster than that of butyl acetate, and may be selected from the group consisting of, for example, toluene, ethyl acetate, acetone, and a combination thereof.

In the present specification, the term "medium-drying solvent" means a solvent whose evaporation rate is one time to one and a half time or more faster than that of butyl acetate, and may be selected from the group consisting of, for example, ethyl alcohol, 2-butyl acetate, and a combination thereof.

In the present specification, the term "slow-drying solvent" means a solvent whose evaporation rate is faster than that of pentanol and slower than that of 2-butyl acetate, and may be selected from the group consisting of, for example, butyl cellosolve, cyclohexanone, dibutylene glycol, dibasic ester, butyl cellosolve acetate, and a combination thereof.

The ketone-based solvent is a solvent having excellent solvating power, and may be selected from the group consisting of methyl ethyl ketone, methyl propyl ketone, methyl butyl ketone, ethyl propyl ketone, methyl isobutyl ketone, and a combination thereof.

Additive

The additive may be selected from the group consisting of a UV absorber, a slip agent, an anti-contamination agent, a light stabilizer, a surface conditioner, a drying promoter, and a combination thereof.

Specifically, the additive may include about 0.1 wt % to about 2 wt % of a UV absorber, about 0.1 wt % to about 0.5 wt % of a slip agent, about 0.1 wt % to about 0.5 wt % of an anti-contamination agent, about 0.1 wt % to about 0.5 wt % of a light stabilizer, about 0.1 wt % to about 0.5 wt % of a surface conditioner, and about 0.1 wt % to about 1 wt % of a drying promoter.

The UV absorber is a constitution for preventing the discoloration and gloss loss of the coating film, and the like, and it is possible to use a UV absorber selected from the group consisting of benzotriazole-based, benzylidenehydantoin-based, benzophenone-based, benzoguanine-based UV absorbers, and a combination thereof.

The slip agent is a constitution for implementing a beautiful appearance by imparting leveling to the surface layer of the coating film and lowering the surface tension to impart enhanced wetting properties to the surface layer, and it is possible to use a silicone-based slip agent such as polyether-modified polymethylalkylsiloxane and polyester-modified polydimethylsiloxane.

The anti-contamination agent is a constitution for preventing contamination on the surface of the coating film, and a nanosilicate-based anti-contamination agent may be used.

As the light stabilizer, microgel, and the like may be used.

The surface conditioner is a constitution for enhancing the appearance quality by adjusting the surface tension of the coating film, and silicone-based, non-silicone-based surface conditioners, and the like may be used.

As the drying promoter, a metal catalyst-based or tertiary amine-based drying promoter, and the like may be used.

Hereinafter, the present invention will be described in more detail through the Examples. However, the Examples are provided for exemplifying the present invention, and the scope of the present invention is not limited thereby.

EXAMPLES

The following examples illustrate the invention and are not intended to limit the same.

Example 1

In the following Table 1, a high-solid coating composition having the same composition as in Example 1-1 and a typical coating composition in the related art having the same composition as in Comparative Example 1-1 were prepared.

Predetermined amounts of a ketone-based solvent and a quick-drying solvent having excellent solvating power were introduced into a washed tank, an acrylic resin was added thereto while stirring the mixture at 600 rpm to 800 rpm, and then a non-aqueous dispersion resin, a radiation curing resin, an additive, and a slow-drying solvent were sequentially introduced thereinto. The resulting mixture was stirred for 20 minutes to 30 minutes. The viscosity was adjusted by using a medium-drying solvent, and the mixture was stirred at 600 rpm to 800 rpm for about 20 minutes, and then filtered by a filter.

TABLE 1

| Classification | | Example 1-1 [wt %] | Comparative Example 1-1 [wt %] |
|---|---|---|---|
| Acrylic resin | Acryl A[1] | — | 25 |
| | Acryl B[2] | — | 20 |
| | Acryl C[3] | — | 20 |
| | First acrylic polyol resin[4] | 45 | — |
| | Second acrylic polyol resin[5] | 30 | — |
| | Non-aqueous dispersion resin[6] | 1 | 2 |
| | Radiation curing resin[7] | 1 | 2 |
| Solvent | Quick-drying solvent[8] | 6 | 11 |
| | Medium-drying solvent[9] | 2 | 6 |
| | Slow-drying solvent[10] | 10 | 7 |
| | Ketone-based solvent[11] | 2.05 | 3.85 |
| Additive | UV absorber[12] | 1 | 1 |
| | Slip agent[13] | 0.4 | 0.4 |
| | Anti-contamination agent[14] | 0.25 | 0.25 |
| | Light stabilizer[15] | 0.4 | 0.4 |
| | Surface conditioner[16] | 0.2 | 0.4 |
| | Drying promoter[17] | 0.7 | 0.7 |
| | Total | 100 | 100 |

Note of Table 1.
[1] Acryl A: Acrylic polyol resin having non-volatile component (NV) 65 wt %, hydroxy group content 1.61 wt %, and glass transition temperature 63.2° C., A-009-NX, Gangnam 0000 Corporation.
[2] Acryl B: Acrylic polyol resin having non-volatile component (NV) 66 wt %, hydroxy group content 2.0 wt %, and glass transition temperature −6° C., A-005-NX, Gangnam 0000 Corporation
[3] Acryl C: Acrylic polyol resin having non-volatile component (NV) 60 wt %, hydroxy group content 2.08 wt %, and glass transition temperature 5.7° C., KH-003, Gangnam 0000 Corporation
[4] First acrylic polyol resin: Acrylic polyol resin having non-volatile component (NV) 80 wt %, hydroxy group content 3.4 wt %, and glass transition temperature 25° C., 7300PS80, ETOOOO Corporation
[5] Second acrylic polyol resin: Acrylic polyol resin having non-volatile component (NV) 70 wt %, hydroxy group content 2.29 wt %, and glass transition temperature 17.3° C., A-005-PX, Gangnam 0000 Corporation.
[6] Non-aqueous dispersion resin: NB-008, Gangnam 0000 Corporation
[7] Radiation curing resin: Aromatic urethane acrylate, RC-007-HXS, Gangnam 0000 Corporation
[8] Quick-drying solvent: Ester-based solvent (ethyl acetate)/Hydrocarbon-based solvent (toluene)
[9] Medium-drying solvent: Ester-based solvent (2-butyl acetate)
[10] Slow-drying solvent: Hydrocarbon-based solvent (KO#100, XY)/Ester-based solvent (dibasic ester)
[11] Ketone-based solvent: Methyl ethyl ketone
[12] UV absorber: EV000083, Campia
[13] Slip agent: Silicone-based, BYK-004, BYK
[14] Anti-contamination agent: Silicate, Dow Corning
[15] Light stabilizer: Microgel, AG-002, Gangnam 0000 Corporation
[16] Surface conditioner: Polyether-modified siloxane, Baysilon OL-17, OMG Borchers GmbH
[17] Drying promoter: Urethane promoter, DBTDL, Gangnam 0000 Corporation The physical properties of the coating compositions according to Example 1-1 and Comparative Example 1-1 were measured. The results are shown in the following Table 2.

TABLE 2

| Classification | Example 1-1 | Comparative Example 1-1 |
|---|---|---|
| Specific weight (20° C.) | 0.987 | 0.983 |
| Viscosity (Ford Cup #4 Viscometer) | 31 sec | 47 sec |
| Non-volatile components of crude solution | 57 wt % | 49 wt % |

TABLE 2-continued

| Classification | Example 1-1 | Comparative Example 1-1 |
|---|---|---|
| Non-volatile components of diluted solution[1] | 51 wt % | 41 wt % |
| Solid by volume ratio of crude solution | 52% | 40.4% |

Note of Table 2.
[1]Non-volatile components of diluted solution: content of non-volatile components measured in a state where a curing agent is introduced into the coating compositions in Example 1-1 and Comparative Example 1-1, and the resulting mixture is diluted.

Referring to Table 2, it can be seen that Example 1-1 being the high-solid coating composition satisfying the present invention has high non-volatile components of a crude solution and high non-volatile components of a diluted solution by about 10 wt % or more as compared to Comparative Example 1-1.

A curing agent, a diluted thinner, and the like were added to the coating compositions according to Example 1-1 and Comparative Example 1-1, and coating films were formed by a spray method. In the case of Example 1-1, the coating composition was coated to have a thickness of 33 μm to 36 μm and an application area of 15.76 m2/l, and in the case of Comparative Example 1-1, a coating film was formed by coating the coating composition to have a thickness of 28 μm to 30 μm and an application area of 13.40 m2/l.

The coating workability, drying property, appearance, and coating properties of the coating film were evaluated as follows. The results are shown in the following Table 3.

TABLE 3

| Item | | Example 1-1 | Comparative Example 1-1 |
|---|---|---|---|
| Coating workability | Flow limitation[1] | 44~46 | 39~41 |
| | Pinhole limitation[2] | 80 or more | 70 or more |
| | Smoothness limitation[3] | 22 or less | 20 or less |
| | Light stability[4] | 60 or less | 50 or less |
| Drying property[5] | | Good | Good |
| Appearance | CF[6] | 80.5 | 64.8 |
| | Gloss (60°)[7] | 95 | 93 |
| Physical properties of coating film | Initial attachment properties[8] | Good | Good |
| | Water resistance[9] | Good | Good |
| | Heat Resistance[10] | Good | Good |
| | Wear resistance[11] | Good | Good |
| | High pressure car washing[12] | Good | Good |
| Comprehensive evaluation | | ◎ | ○ |

Note of Table 3.
[1]Flow limitation: means the degree to which the coating film does not flow after a vertical clear gradient coating. A higher numerical value means that the flow limitation is excellent.
[2]Pinhole limitation: means a degree to which pinholes are not generated on the coating film after clear gradient coating and drying. A higher numerical value means that the pinhole limitation is excellent.
[3]Smoothness limitation: means the degree to which the coating film is smooth during the clear gradient coating on a base color. A lower numerical value means that the smoothness is excellent.
[4]Light stability: means the degree to which after gradient coating of a base color (black), gloss loss does not occur after drying in clear even distribution coating.
[5]Drying property: a predetermined test specimen was coated with primer/even distribution coating (4 to 8 μm), base color/even distribution coating (20 to 30 μm), and HS clear (32 to 42 μm), and then the drying property was evaluated under conditions of 80° C. for 40 minutes. After being dried, the test specimen was left to stand for 30 minutes, and then during the evaluation, it was shown that the case where the sanding property 800# was 10 times or less was poor, the case where the sanding property 800# was 10 times was fair, and the case where the sanding property was 10 or more was good.
[6]CF: expresses a value measured using a wave scan apparatus. A high value measured indicates that the gloss of the appearance, image clarity, orange peel (OP) values are excellent.
[7]Gloss: measured by a BYK Gloss meter. Typically, the gloss is measured at 60°, and a high value indicates that the degree of gloss is good.
[8]Initial attachment properties: in accordance with an ASTM D3359 tape attachment test method, the degree of a portion which had been peeled off was observed after the tape adhesive test in 100 graduations with 1 mm × 1 mm. The case of M-2.5 or more was indicated to be good.
[9]Water resistance: was evaluated by observing the presence or absence of discoloration, unevenness, and blisters of the test specimen, and the attachment property test when the test specimen was immersed in a water bath under conditions of 40° C. and 240 hours. When the foregoing test conditions are satisfied, the result was proved to be good.
[10]Heat Resistance: was evaluated by observing the discoloration, unevenness, and an attachment test when the test specimen was left to stand under conditions of an oven temperature of 80° C. and 300 hours. When the foregoing test conditions are satisfied, the result was proved to be good.
[11]Wear resistance: was evaluated by observing how much the coating film was worn after the test specimen was allowed to go and come back 10,000 times at a rate of 30 round/min while a scale weight of 1 kg was attached thereto. The case where the material was not exposed due to the wear of the coating film was evaluated to be good.
[12]High pressure car washing: was evaluated by cutting a coated test specimen in accordance with an attachment test method (100 graduations with 1 mm × 1 mm), and spraying the test specimen using a predetermined high pressure car washing test machine. It was observed by spraying high-pressure water at a pressure of 70 kgf at a distance of 10 cm from the predetermined high pressure car washing test machine how much the coating film was peeled off. The case of M-2.5 or less was indicated to be good.

Referring to Table 3, it can be seen that Example 1-1 being the high-solid coating composition according to an exemplary embodiment of the present invention exhibited excellent results in terms of all the aspects in coating workability as compared to Comparative Example 1-1, and drying properties are excellent unlike the high-solid coating composition in the related art.

It can also be seen that Example 1-1 exhibited excellent results in terms of both CF value being an appearance evaluation index and gloss as compared to Comparative 1-1. Together with the result, Example 1-1 also exhibited good results in terms of physical properties of the coating film, such as attachment property, water resistance, heat resistance, wear resistance, and high pressure car washing.

Example 2

In the following Table 4, the high-solid coating compositions having the same compositions as in Examples 2-1 and 2-2 and the high-solid coating compositions having the same compositions as in Comparative Examples 2-1 to 2-3 were prepared.

A coating composition was prepared in the same manner as in Example 1, except for the composition of each constituent component.

TABLE 4

| Classification [wt %] | | Example 2-1 | Example 2-2 | Comparative Example 2-1 | Comparative Example 2-2 | Comparative Example 2-3 |
|---|---|---|---|---|---|---|
| Acrylic resin | First acrylic polyol resin | 40 | 35 | 45 | 40 | 30 |
| | Second acrylic polyol resin | 30 | 15 | 5 | 10 | 10 |
| | Third acrylic polyol resin[1] | 5 | 25 | 25 | 25 | 35 |
| Non-aqueous dispersion resin | | 1 | 1 | 2 | 2 | 2 |
| Radiation curing resin | | 1 | 1 | 1 | 1 | 1 |
| Solvent | Quick-drying solvent | 6 | 7 | 8 | 7 | 7 |
| | Medium-drying solvent | 2 | 2 | 4 | 4 | 3 |
| | Slow-drying solvent | 10 | 9 | 5 | 6 | 7 |
| | Ketone-based solvent | 1.85 | 1.85 | 1.85 | 1.85 | 1.85 |

TABLE 4-continued

| Classification [wt %] | | Example 2-1 | Example 2-2 | Comparative Example 2-1 | Comparative Example 2-2 | Comparative Example 2-3 |
|---|---|---|---|---|---|---|
| Additive | UV absorber | 1 | 1 | 1 | 1 | 1 |
| | Slip agent | 0.4 | 0.4 | 0.4 | 0.4 | 0.4 |
| | Anti-contamination agent | 0.25 | 0.25 | 0.25 | 0.25 | 0.25 |
| | Light stabilizer | 0.4 | 0.04 | 0.4 | 0.4 | 0.4 |
| | Surface conditioner | 0.4 | 0.04 | 0.4 | 0.4 | 0.4 |
| | Drying promoter | 0.7 | 0.7 | 0.7 | 0.7 | 0.7 |
| Total | | 100 | 100 | 100 | 100 | 100 |

Note of Table 4.
1)Third acrylic polyol resin: Acrylic polyol resin having non-volatile component (NV) 80 wt %, hydroxy group content 2.1 wt %, and glass transition temperature 16° C., 70006-S-80, ETOOOO Corporation Coating films were formed of coating compositions according to Examples 2-1 and 2-2 and Comparative Examples 2-1 to 2-3. Coating films were formed in the same condition and method as in Example 1-1.

The coating workability, drying property, appearance, and coating properties of the coating film were evaluated as follows. The results are shown in the following Table 5.

TABLE 5

| | Item | Example 2-1 | Example 2-2 | Comparative Example 2-1 | Comparative Example 2-2 | Comparative Example 2-3 |
|---|---|---|---|---|---|---|
| Coating workability | Flow limitation | 43~45 | 43~45 | 40~42 | 40~42 | 40~43 |
| | Pinhole limitation | 80 or more | 80 or more | 80 or more | 80 or more | 80 or more |
| | Smoothness limitation | 22 or less | 22 or less | 22 or less | 22 or less | 22 or less |
| | Light stability | 60 or less | 60 or less | 60 or less | 60 or less | 60 or less |
| Drying property | | Good | Good | Poor | Poor | Fair |
| Appearance | CF | 79.3 | 78.8 | 75.4 | 75.8 | 78.1 |
| | Gloss (60°) | 95 | 96 | 95 | 95 | 95 |
| Physical properties of coating film | Initial attachment properties | Good | Good | Good | Good | Good |
| | Water resistance | Good | Good | Good | Good | Good |
| | Heat Resistance | Good | Good | Good | Good | Good |
| | Wear resistance | Good | Good | Good | Good | Good |
| | High pressure car washing | Good | Good | Good | Good | Good |
| Comprehensive evaluation | | ◎ | ○ | Δ | Δ | ○ |

Referring to Table 5, it can be seen that all of the coating workability, drying properties, appearance, and coating physical properties may be improved when as acrylic resins, 35 wt % to 40 wt % of a first acrylic polyol resin having specific physical properties, 15 wt % to 30 wt % of a second acrylic polyol resin having specific physical properties, and 5 wt % to 25 wt % of a third acrylic polyol resin having specific physical properties need to be used, and 9 wt % to 10 wt % of a slow-drying solvent needs to be used.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A high-solid coating composition comprising:
70 wt % to 80 wt % of an acrylic resin; and
15 wt % to 21 wt % of a solvent,
wherein a content of non-volatile components (NVs) is 55 wt % to 60 wt %, a solid by volume ratio (SVR) is 50% to 55%, and a combination factor (CF) value being an appearance evaluation index is 78% or more, wherein the CF value is measured by a wave scan instrument,
wherein the acrylic resin comprises: a first acrylic polyol resin having a non-volatile component (NV) content of 70 wt % to 80 wt %, a hydroxy group content of 3.0 wt % to 3.5 wt %, and a glass transition temperature of 20° C. to 30° C.; and a second acrylic polyol resin having a non-volatile component (NV) content of 70 wt % to 80 wt %, a hydroxy group content of 2.2 wt % to 2.5 wt %, and a glass transition temperature of 17° C. to 20° C.

2. The high-solid coating composition of claim 1, wherein a viscosity measured by a Ford Cup #4 viscometer is 30 seconds to 35 seconds.

3. The high-solid coating composition of claim 1, further comprising:
1 wt % to 4 wt % of an additive, wherein the additive is selected from the group consisting of a UV absorber, a slip agent, an anti-contamination agent, a light stabilizer, a surface conditioner, a drying promoter, and a combination thereof.

4. The high-solid coating composition of claim 1, wherein the acrylic resin comprises: 35 wt % to 45 wt % of the first acrylic polyol resin; and 25 wt % to 35 wt % of the second acrylic polyol resin, wherein the weight percent is based on the total weight of the high-solid coating composition.

5. The high-solid coating composition of claim 1, wherein the acrylic resin comprises: 45 wt % of the first acrylic polyol resin; and 30 wt % of the second acrylic polyol resin, wherein the weight percent is based on the total weight of the high-solid coating composition.

6. The high-solid coating composition of claim 1, wherein the acrylic resin comprises: the first acrylic polyol resin having a non-volatile component (NV) content of 70 wt % to 80 wt %, a hydroxy group content of 3.0 wt % to 3.5 wt %, and a glass transition temperature of 20° C. to 30° C.; the second acrylic polyol resin having a non-volatile component (NV) content of 70 wt % to 80 wt %, a hydroxy group content of 2.2 wt % to 2.5 wt %, and a glass transition temperature of 17° C. to 20° C.; and a third acrylic polyol resin having a non-volatile component (NV) content of 70 wt % to 80 wt %, a hydroxy group content of 1.8 wt % to 2.1 wt %, and a glass transition temperature of 10° C. to 16° C.

7. The high-solid coating composition of claim 6, wherein the acrylic resin comprises: 35 wt % to 40 wt % of the first acrylic polyol resin; 15 wt % to 30 wt % of the second acrylic polyol resin; and 5 wt % to 25 wt % of the third acrylic polyol resin, wherein the weight percent is based on the total weight of the high-solid coating composition.

8. The high-solid coating composition of claim 6, wherein the acrylic resin comprises: 40 wt % of the first acrylic polyol resin; 30 wt % of the second acrylic polyol resin; and 5 wt % of the third acrylic polyol resin, wherein the weight percent is based on the total weight of the high-solid coating composition.

9. The high-solid coating composition of claim 1, further comprising:
a non-aqueous dispersion resin; and a radiation curing resin.

10. The high-solid coating composition of claim 1, where the solvent comprises a slow-drying solvent, and the slow-drying solvent is selected from the group consisting of butyl cellosolve acetate, dibasic ester, and a combination thereof.

11. The high-solid coating composition of claim 1, wherein the solvent comprises: 6 wt % to 7 wt % of a quick-drying solvent; 1 wt % to 2 wt % of a medium-drying solvent; 9 wt % to 10 wt % of a slow-drying solvent; and 1.5 wt % to 2.5 wt % of a ketone-based solvent, wherein the weight percent is based on the total weight of the high-solid coating composition.

12. A coating method using a high-solid coating composition comprising:
forming a coating film by coating the high-solid coating composition according to claim 1 to a thickness of 30 μm to 40 μm.

13. The coating method of claim 12, wherein the coating film is formed by coating the high-solid coating composition with an application area of 15 $m^2/l$ to 20 $m^2/l$.

* * * * *